(12) United States Patent
Blyler, Jr. et al.

(10) Patent No.: US 6,527,986 B2
(45) Date of Patent: Mar. 4, 2003

(54) EXTRUSION PROCESS FOR FABRICATING PLASTIC OPTICAL FIBER

(75) Inventors: Lee L. Blyler, Jr., Basking Ridge, NJ (US); Arthur Clifford Hart, Jr., Chester, NJ (US); Ramabhadra Ratnagiri, North Plainfield, NJ (US); Whitney White, Chatham, NJ (US)

(73) Assignee: Fitel USA Corp., Norcross, GA (US)

( * ) Notice: Subject to any disclaimer, the term of this patent is extended or adjusted under 35 U.S.C. 154(b) by 253 days.

(21) Appl. No.: 09/778,298

(22) Filed: Feb. 7, 2001

(65) Prior Publication Data
US 2002/0105102 A1 Aug. 8, 2002

(51) Int. Cl.$^7$ ................................. B29D 11/00
(52) U.S. Cl. ....................... 264/1.29; 264/1.7
(58) Field of Search ................. 264/1.1, 1.24, 264/1.29, 1.7

(56) References Cited

U.S. PATENT DOCUMENTS

| | | | |
|---|---|---|---|
| 5,347,852 A | 9/1994 | Mode | |
| 5,458,836 A | 10/1995 | Rakestraw et al. | |
| 5,555,525 A | 9/1996 | Ho et al. | |
| 5,593,621 A | 1/1997 | Koike et al. | |
| 5,599,897 A | 2/1997 | Nishiguchi et al. | |
| 5,614,253 A | 3/1997 | Nonaka et al. | |
| 5,632,902 A | 5/1997 | Kalman | |
| 5,639,512 A | 6/1997 | Nonaka et al. | |
| 5,729,645 A | 3/1998 | Garito et al. | |
| 5,747,610 A | 5/1998 | Katoot | |
| 5,752,539 A | 5/1998 | Kalman | |
| 5,760,139 A | 6/1998 | Koike et al. | |
| 5,783,636 A | 7/1998 | Koike et al. | |
| 6,106,745 A | 8/2000 | Krins et al. | |

OTHER PUBLICATIONS

R. B. Bird et al., *Transport Phenomena*, John Wiley & Sons (1960).
Rajagopalan et al., Finite element methods for calculation of steady, viscoelastic flow using constitutive equations with a Newtonian viscosity, *J. Non–Newt. Fluid Mech.*, vol. 36, 159 (1990).
A.N. Brooks et al., *Comp. Meth. Appl. Mech. Eng.*, vol. 32, 199 (1982).
P. Hood, "Frontal solution program for unsymmetric matrices", *Int. J. Numer. Meth. Eng.*, vol. 10, 379 (1976).
D. Marcuse, *Principles of Optical Fiber Measurement*, Academic Press, New York, pp. 150–161 (1981).
J. Crank, The Mathematics of Diffusion, Second Edition, Oxford University Press, New York (1975).
H. Takahashi, et al. "Fabrication techniques of GI POF towards mass production", $7^{th}$ *International Plastic Optical Fibres Conference*, 8, pp. 50–54 (1998).
U.S. patent application Ser. No. 09/321,050 filed May 27, 1999.

*Primary Examiner*—Mathieu D. Vargot
(74) *Attorney, Agent, or Firm*—Scott Rittmar

(57) ABSTRACT

An improved process for extruding plastic optical fiber without the need to prepare a preform is provided. Specifically, it was discovered that conventional extrusion techniques, e.g., screw extruders, tended to introduce an undesirable amount of particulate contaminants which increased the loss of the drawn fiber. To overcome this problem, the invention substantially reduces the number of mechanical interactions that contribute to such contamination. The process of the invention does so by using fluid pressure, instead of, e.g., screw extruders, to induce polymer flow. The process also controls the flow characteristics of the polymer, or halts the flow altogether, without mechanical controls. Specifically, the temperature of the sections through which the polymer flows is controllably adjusted, such that it is possible to bring the polymer to a desired flow rate or even to a solid state to provide a plug.

16 Claims, 4 Drawing Sheets

EXTRUSION PROCESS FOR FABRICATING PLASTIC OPTICAL FIBER

BACKGROUND OF THE INVENTION

1. Field of the Invention

The invention relates to fabrication of graded-index plastic optical fiber.

2. Discussion of the Related Art

Glass optical fiber has become a significant transmission medium in recent years, particularly for long distance transmission applications. Such optical fiber has not found significant usage, however, in smaller scale applications, such as distribution of fiber to the desk in local area networks. In particular, glass optical fiber has not been as cost effective as, for example, copper wire, and connectorization of glass fiber (which needs well-polished end faces) requires substantial time, skilled personnel, and precise connector components. There has been interest, therefore, in pursuing plastic optical fiber (POF). POF offers many of the benefits of glass optical fiber, but is expected to be more cost effective, and POF also offers a larger core that makes connection easier.

Initially, step index POF (having a core of one refractive index, surrounded by a cladding of a lower refractive index) was manufactured and used. Unfortunately, the modes propagating in a step index fiber experience an undesirably high level of dispersion, thereby limiting the fiber's capability. In response to this problem, graded index POF (GI-POF) was developed, which possesses a varying refractive index from the core to the cladding layer. GI-POF exhibits a lower level of mode dispersion, thereby providing improved properties. GI-POF, however, was more difficult, and thus more expensive, to manufacture than step index POF. Improved methods for manufacturing GI-POF were therefore sought.

One method of forming GI-POF is to start with a preform, similar to the preform from which glass optical fiber is generally drawn. See, e.g., U.S. Pat. Nos. 5,639,512 and 5,614,253, which discuss a process for chemical vapor deposition (CVD) formation of a preform for GI-POF. According to the process, a polymer and a refractive index modifier are deposited onto a rod, and the amount of refractive index modifier is varied during the deposition to provide the desired refractive index profile. While such preforms are useful for preparing GI-POF, easier processes are desired.

One alternative to preform-formation is extrusion, which is commonly used with plastics to form a variety of items. Extrusion was expected to be quicker and cheaper than forming and drawing a preform, but the need for a graded refractive index profile created complications. U.S. Pat. No. 5,593,621 (the '621 patent) discusses an extrusion process for GI-POF. According to the '621 patent, GI-POF is manufactured by extruding one material circumferentially around another material, e.g., by use of a concentric nozzle. At least one of the materials contains a diffusible material having a distinct refractive index, such that the diffusion of the material provides the desired refractive index contrast. The method of the '621 patent appears to offer a functional process, but also appears to exhibit several drawbacks.

In particular, it is not clear that the process is able to be performed without providing a delay time (stopping the flow of material) or a very slow extrusion speed, to allow the diffusible material sufficient time to diffuse. Specifically, the examples disclose a small distance, 3 cm, between the outlet of concentric nozzle 5 (see FIG. 1) and the outlet of core nozzle 3. Thus, the two materials are in contact only over this small distance before exiting the apparatus. It is unclear whether this small contact distance allows sufficient diffusion, without requiring either intermittent stoppage or an extremely slow extrusion speed. It appears that either stoppage or low speed was used, because, for example, Embodiment 6 states that diffusion was effected for about 3 minutes within this contact region, and Embodiments 7, 8, and 9 all state that diffusion occurred for about 10 minutes in the contact region. Unfortunately, the reference does not disclose an extrusion speed nor make clear whether the process had to be halted intermittently. In addition, there is no information on how to predict the refractive index profile in the resulting fiber, and trial-and-error is apparently required to find appropriate process parameters.

An improved extrusion technique for plastic optical fiber is reflected in co-assigned U.S. patent application Ser. No. 09/321,050 filed May 27, 1999 (our reference Blyler 43-18-1-18), the disclosure of which is hereby incorporated by reference. Further improvements in such extrusion methods are desired.

SUMMARY OF THE INVENTION

The invention provides an improved process for extruding plastic optical fiber without the need to prepare a preform. Specifically, it was discovered that conventional extrusion techniques, e.g., screw extruders, tended to introduce an undesirable amount of particulate contaminants which increased the loss of the drawn fiber. To overcome this problem, the invention substantially reduces the number of mechanical interactions that contribute to such contamination. The process of the invention does so by using fluid (typically gas) pressure, instead of screw extruders, to induce polymer flow. The process also controls the flow characteristics of the polymer, or halts the flow altogether, without mechanical controls. Specifically, the temperature of the sections through which the polymer flows is controlled, such that it is possible to bring the polymer to a desired flow rate, or even to a solid state to provide a plug. Using the process of the invention, high quality graded index plastic optical fiber is possible, e.g., GI-POF that exhibits a relatively low loss of 50 dB/km or better.

DETAILED DESCRIPTION OF THE INVENTION

Figure 1:
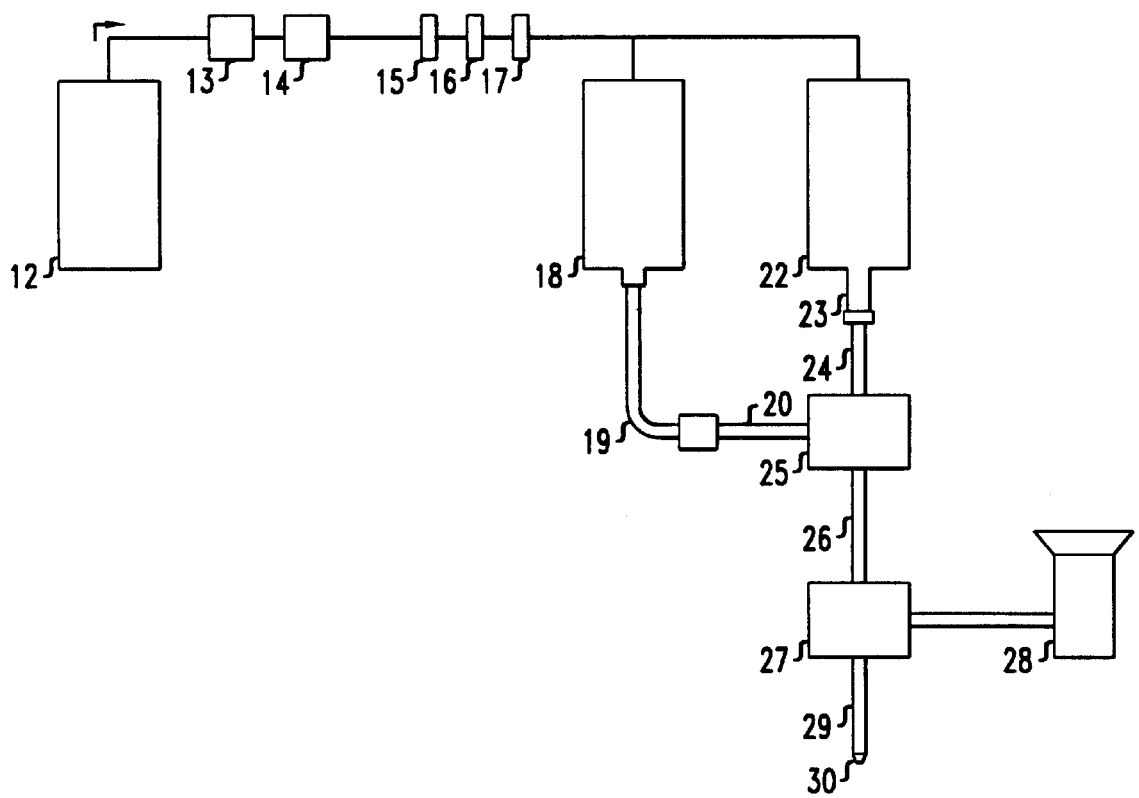
FIG. 1 is a schematic illustration of an apparatus suitable for practicing an embodiment of the invention.

An extrusion apparatus 10 suitable for practicing an embodiment of the invention is schematically illustrated in FIG. 1. The apparatus 10 comprises a tank 12 containing a gas that is capable of providing the necessary pressure for extrusion. Typically the gas is nitrogen. The gas flows from the tank 12 into one or more high pressure regulators 13, 14. The gas then flows through one or more filters 15, 16, 17 to lower particulate contamination in the gas, and is then directed into a cladding reservoir 18 and a core reservoir 22. The reservoirs 18, 22 contain molten cladding polymer and core polymer, with one or both of the polymers typically doped to provide a desired refractive index profile in the final fiber. The pressure of the gas forces the polymers out of the reservoirs 18, 22 toward a first crosshead 25. Generally, a constant gas pressure is maintained, with the precise flow rate of the polymers controlled by temperature, as discussed below. Multiple gas sources are possible.

A significant feature of the invention is the treatment of the polymer as it flows from the reservoirs. According to this embodiment, the molten polymer exiting the reservoirs 18, 22 encounters thermal homogenizer sections 19, 23. The thermal homogenizer sections 19, 23 are designed to bring the molten polymers to a substantially uniform temperature (determined according to guidelines discussed herein), which is often different from the reservoir 18, 22 temperature. (It is possible, however, to provide the temperature homogenization in the reservoir, instead of using separate thermal homogenizer sections.)

The molten polymer, having achieved the substantially uniform temperature, then flows into flow restrictor sections 20, 24, which are generally maintained at the same temperature as the thermal homogenizer sections 19, 23. The flow restrictor sections 20, 24 act to regulate the polymer flow rates. Specifically, given a flow restrictor section of a particular geometry, it is possible to adjust the temperature to attain a viscosity that provides the desired flow rate. Typically, the flow restrictor sections are of smaller diameter than the thermal homogenizer sections, since the function of the thermal homogenizer sections is to provide polymer with a substantially uniform temperature, while the function of the flow restrictor sections is to control the flow of the polymer. The thermal homogenizer sections 19, 23 and the flow restrictor sections 20, 24 are heated by any suitable technique. One useful heating technique is surrounding the sections with an aluminum cylinder having an inner profile that substantially matches the outer profile of the sections, including any fittings that are present, and then surrounding the aluminum cylinder with resistive heating tape. In addition to controlling flow rate by adjusting the temperature of the thermal homogenizer sections and flow restrictor sections, it is also possible to seal the reservoirs, e.g., to allow replenishment of polymer, by cooling these sections such that the polymer becomes non-flowing, and thus essentially plugs the reservoir. Such a step is useful in embodiments of the invention that provide for continuous extrusion, as discussed below.

Figure 2:
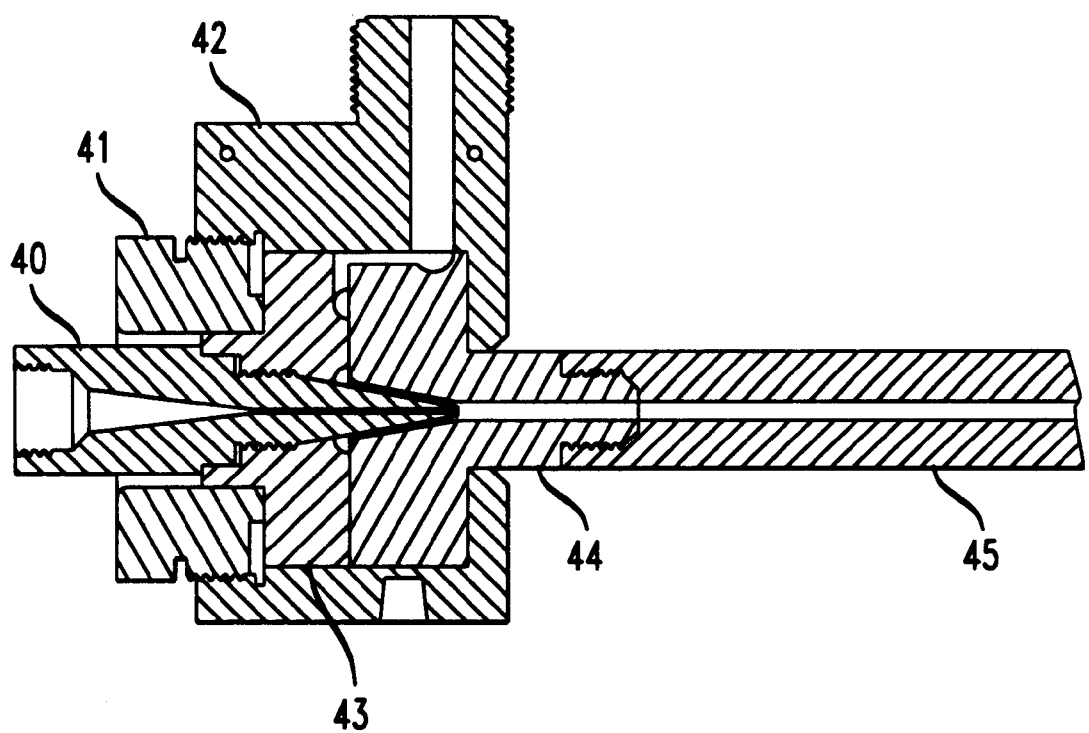
FIG. 2 is a co-extrusion head suitable for use in the process of the invention.

The flow restrictor sections 20, 24 feed the cladding polymer and the core polymer into a first extrusion crosshead 25. The first extrusion crosshead 25 directs the core polymer into the central section of a diffusion section 26 and distributes the cladding polymer concentrically around the core polymer in the diffusion section 26. The core polymer and cladding polymer thereby flow together in the diffusion section 26, advantageously in a smooth laminar flow without disruption of the core/cladding interface. A detailed view of a particular cross head, a co-extrusion head, is shown in FIG. 2. The co-extrusion head is designed to distribute the annular cladding melt stream around the central core melt stream in a smooth, laminar flow with no disruption of the interface between them. The joined streams co-flowed axially into a tubular diffusion section, e.g., of 5 mm inner diameter. The molten core material is introduced into the center of the crosshead assembly via a core tube 40, which includes a gradually tapered (e.g., 5°) internal cross section followed by a long, straight section of constant cross sectional area. The tapered region provides a transition in cross sectional area for the molten core material to flow from an extruder output nozzle to the smaller diameter required at the point the core and cladding materials are brought together. The inner diameter of the exit end of the core tube 40 is held, for example, at about 40% of the channel diameter in the die holder 44, just downstream, where the core and cladding materials are joined. The external surface of the exit end of the core tube 40 is also tapered (e.g., 10°) and forms the interior wall of the transition region that directs the cladding material to flow into the channel in the die holder 43, where the cladding material joins with the core material.

The cladding material is introduced into the crosshead assembly via a channel in the crosshead housing 42, from which the cladding material flows into a channel machined in the side of die holder 44. The material flows upward and exits this channel to flow into distributing channels machined into the lower surface of core tube holder 43. The distributing channels assure a relatively uniform flow of cladding material around the tapered exterior of the core tube 40 by dividing the flow into four streams and introducing them to the tapered channel 90° apart. With this arrangement the core and cladding melt streams are joined together in a smooth regular manner, with little, if any, disruption of the interface between the two materials or distortion of the concentric circular geometry of the core/cladding cross section. The assembly is held together by a nut 41, which threads into crosshead housing 42, and clamps all assembled parts together to prevent leakage. The diffusion section 45 is threaded onto the die holder 44.

In the diffusion section 26, the dopant(s) present in the core and/or cladding undergo molecular diffusion from the cladding polymer into the core polymer and/or vice versa, to form the desired graded refractive index profile. The diffusion section is thus maintained at a particular temperature to promote this diffusion (typically 200 to 270° C.), and is of sufficient length to allow the desired extent of diffusion to occur (typically 33 to 400 cm, typically at least 50 cm, and optionally at least 100 cm). Optionally, the diffusion section comprises one or more lengths capable of being threaded together, and threaded onto the first and/or second extrusion crossheads 25, 27, such that length modifications are easily made. By the time the flowing polymer reaches the end of the diffusion section 26, substantially all of the desired diffusion has generally taken place. It is possible, however, to configure the apparatus to provide some diffusion after a protective cladding layer is deposited.

The flowing polymer is then typically directed from the diffusion section 26 into a second extrusion crosshead 27. The second extrusion crosshead coats the core/cladding polymer with a protective cladding, e.g., polycarbonate, fed from a hopper 28 by any suitable extrusion technique, to provide mechanical reinforcement of the fiber. The second crosshead 27 is generally similar to the first crosshead, but may have larger flow channels if a relatively thick protective cladding is desired. The polymer flow is then generally directed into a conditioning section 29. At least a portion of the conditioning section 29 is optionally kept at a lower temperature than the diffusion section 26, with this temperature (in combination with the length of the conditioning section 29) selected to improve the draw properties of the polymer. The cooler temperature also tends to contribute to locking-in the dopant profile. The conditioned polymer is then directed through an exit die 30 that provides the desired final diameter, and is pulled from the die, using conventional techniques, e.g., a capstan that provides the desired draw rate, a spool to take up the fiber, and a diameter monitor that may be used in a feedback mode with the capstan to improve diameter control. The die generally has a tapered inlet that provides a transition from the cross-section of the conditioning section 26 to a straight land at the end of the die. The land generally has an inner diameter of 1 to 5 mm.

It is possible to put additional or intermediate layers on the fiber by similar co-extrusion techniques.

The process of the invention is capable, depending on the particular polymers and particular fiber characteristics, of extruding plastic optical fiber at a line speed of at least 0.3 meter/second, advantageously at least 1 meter/second.

As noted above, particulate contamination from various moving parts tends to contribute to degradation of the properties of the drawn fiber. According to the invention, sources of such contamination are significantly reduced. The elimination of moving parts in the extruder, i.e., a screw, is provided by use of fluid pressure. And flow control of the polymer is provided by temperature adjustment, as opposed to mechanical intervention. To promote further reduction in particulates, for perfluorinated polymers or other corrosive materials, corrosion resistant materials, such as Hastelloy® and other nickel-based materials, are used wherever feasible. In addition, the apparatus is advantageously assembled, and parts cleaned, under clean room conditions.

A variety of fluids are suitable for providing the extrusion pressure. Typically, the fluid is a gas, but it is also possible to use liquids, e.g., liquids that are immiscible with the polymer and/or that are readily able to be made volatile to ease removal from the reservoirs. Gases used to provide the pressure for extrusion are typically relatively inert, e.g., nitrogen. The gas simply needs to be able to provide the necessary pressure while advantageously causing little or no interference with the overall process, i.e., no chemical interactions with the polymer and no inducement of bubbles (although it is possible to reduce bubble formation by use of particular reservoirs or metal sections, as discussed below). A range of pressures are possible, depending on the particular system. Generally, as noted above, one or more high pressure regulators are provided to regulate the gas pressure, and one or more conventional filters are provided to reduce or substantially eliminate introduction of particulates in the gas stream.

The reservoirs generally consist of a lid, a body, a funnel attachment to downstream sections, and heaters around the exterior. Where needed, the body is formed of a corrosion-resistant material. The lid attachment is desirably formed to reduce particle generation as much as possible. High temperature seals are formed of suitable materials, e.g., Kalrez™ or bare metal flanges.

The polymers are typically added to the respective reservoirs in solid form, and melted therein. The invention is capable of producing graded-index plastic optical fibers from a variety of transparent thermoplastic polymers exhibiting useful refractive index, glass transition temperatures and optical transmission characteristics, and for which compatible, refractive index-altering dopants exhibiting sufficient mobility at processing temperatures in the polymer are available. Glass transition temperature typically ranges from about 90° C. to about 260° C., refractive index typically ranges from about 1.3 to about 1.6, and transmission losses typically range from 10 to 1000 dB/km for the bulk polymer. Viscosities (at 180 to 260° C.) typically range from 100 to 1,000,00 poise, more typically 1000 to 100,000 poise. Examples of suitable polymers include poly(methyl methacrylate) (PMMA), polycarbonate, polystyrene, styrene-acrylonitride copolymers (SAN), poly(perfluorobutenyl vinyl ether) (CYTOP™) and copolymers of tetrafluoroethylene and 2,2 bistrifluoromethyl-4,5-difluoro-1,3-dioxole (Teflon AF™). Perfluorinated polymers are particularly advantageous.

The dopant is typically an index-raising substance added to the core polymer. (As used herein, dopant indicates one or more diffusible materials.) Alternatively, the dopant is an index-lowering substance added to the cladding polymer. Useful dopants are relatively low molecular weight compounds which: 1) are soluble in the polymers used for the GI-POF and do not phase-separate or crystallize in the polymers over time; 2) do not significantly increase the transmission loss of the polymers; 3) do not depress the glass transition temperature of the polymers by an unacceptable degree; 4) have sufficiently high diffusivities in the polymers at processing temperatures, e.g., $10^{-8}$ to $10^{-5}$ cm$^2$/sec; 5) provide large changes in refractive indices at low concentrations in the polymers, e.g., $\Delta n > 0.015$ for less than 15 wt. % dopant; 6) are chemically stable in the polymers at processing temperatures and in operating environments over the long term; 7) have low volatility at processing temperatures; and 8) are substantially immobilized in the glassy polymer in operating environments. Optional dopants for use with PMMA include bromobenzene, benzylbutylphthalate, benzyl benzoate, diphenyl phthalate, and diphenyl sulfide. Suitable dopants for use with CYTOP™ or Teflon AF™ include per-halogenated oligomers and per-halogenated aromatic compounds, which optionally include heteroatoms. It is also possible to make step-index fibers using two different polymers, and no dopants.

A significant feature of the invention is the ability to control polymer flow, particularly the relative flow of the core and cladding polymers, into the first extrusion crosshead by use of temperature, thereby eliminating the need for mechanical controls and associated contamination. In particular, the temperature to which the polymers are brought prior to introduction into the flow restrictor sections is selected to provide a desired viscosity that provides a desired flow rate through that particular section. Thus, the temperature will vary depending on the properties of an individual polymer (including the effect of dopants present in the polymer), and on any variations in the flow restrictor section itself. To monitor the temperature closely, it has been found to be advantageous to use resistive thermometers, e.g., resistive temperature detectors or RTDs, on the thermal homogenizer sections and flow restrictor sections. Selecting a temperature to provide a particular viscosity, and thus a particular flow rate through a given flow restrictor section is capable of being performed using conventional techniques. Techniques for providing flow rate feedback are typically useful for monitoring the flowing polymers. Such techniques include optical, viscometric, acoustic, or gas flow measurement of polymer displacement.

Figure 3:
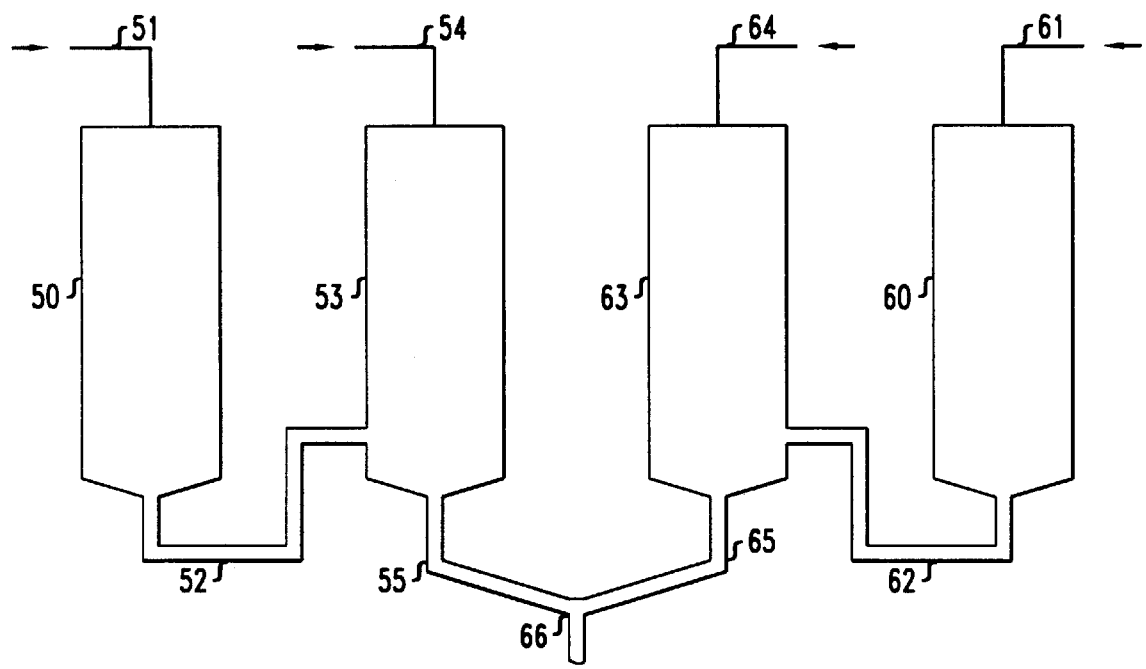
FIG. 3 illustrates a technique for continuous extrusion according to an embodiment of the invention.

It is possible to provide for continuous operation of an extrusion apparatus such as illustrated in FIG. 1, by providing two or more core polymer reservoirs and two or more cladding polymer reservoirs. The apparatus is configured to allow filling of one or more of the reservoirs while maintaining the polymer flow from one or more of the other reservoirs. One embodiment of such a continuous operation is shown, in part, in FIG. 3. FIG. 3 illustrates two feed reservoirs 50, 60 connected by feed lines 52, 62 to primary reservoirs 53, 63 that direct polymer through sections 55, 65, and into a manifold 66 that directs the polymer into the remainder of the apparatus. (Thermal homogenization can be done in the manifold 66 or further downstream.) (This pairs of reservoirs provides either the core or the cladding polymer. An additional pair having a similar configuration is required for other polymers.) Relatively low pressure gas lines 51, 61, e.g., 100 psi, are connected to the feed reservoirs 50, 60, and relatively high pressure gas lines 54, 64, e.g., 2000 psi, capable of providing the necessary pressure for extrusion are connected to the primary reservoirs 53, 63. Operation of this portion of an extrusion apparatus would typically involve the steps of (with variations being possible):

(1) cooling the feed line 52 from a first feed reservoir 50 to a first primary reservoir 53 to a temperature that essentially provides a polymer plug, and then filling the first feed reservoir 50 with solid polymer and heating the reservoir 50 to provide a polymer melt;

(2) while a second primary reservoir 63 is providing sufficient polymer to maintain the extrusion process, halting the gas flow from the high pressure gas line 54 into the first primary reservoir 53 while keeping the temperature of the connection 55 from the first primary reservoir 53 into the manifold 66 low enough to substantially stop or prevent flow of the polymer through that connection 55;

(3) admitting gas from the low pressure gas line 51 into the first feed reservoir 50 while heating the feed line 52, to promote polymer flow from the first feed reservoir 50 into the first primary reservoir 53;

(4) after the first primary reservoir 53 is sufficiently filled, cooling the feed line 52 from the first feed reservoir 50 to the first primary reservoir 53 to a temperature that halts the polymer flow and essentially plugs the first primary reservoir 53, while halting the gas flow from the low pressure gas line 51; and (5) after step (4) is completed, engaging the gas flow through high pressure gas line 54 and heating the connection 55 from the first primary reservoir 53 to the manifold 66 to a desired temperature, to begin flow of the polymer from the first primary reservoir into the remainder of the extrusion apparatus (and adjusting the controls of the second primary reservoir 63 to maintain the desired polymer flow).

The same process is used to refill the second primary reservoir 63. By switching back and forth between reservoirs, essentially continuous operation is possible.

Figure 4:
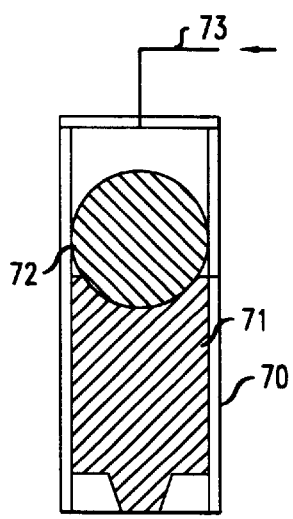
FIG. 4 illustrates a technique for reducing gas adsorption into molten polymer, according to an embodiment of the invention.

A potential problem with using gas pressure to drive extrusion is the possibility that the gas will be absorbed into the polymer, and thereby induce bubble formation in the drawn fiber. To reduce or avoid such absorption, it is possible to use an arrangement such as illustrated in FIG. 4. According to this arrangement, a reservoir 70 having a molten polymer 71 therein is provided with a pressure transfer element 72. The element 72 is typically a sphere having a diameter that closely matches the inner diameter of the reservoir 70, although other shapes are possible. The element 72 is generally formed from a material that is corrosion resistant and that will substantially avoid introducing particulates into the reservoir, with the particular material dependent largely on the corrosiveness of the polymer. Suitable materials include Hastelloy, nickel, and similar corrosion-resistant alloys. (The relatively high viscosity of typical polymers used is generally sufficient to prevent the elements from sinking.) Gas directed into the reservoir through gas line 73 will encounter the pressure transfer element 72, and the gas pressure will thereby be transferred by the element 72 to the molten polymer 71. In this way, direct contact between the gas and the molten polymer 71 is reduced.

It is also possible to remove absorbed gases from the molten polymer by using one or more porous metal elements, e.g., in the diffusion section. The porous metal allows the gas to escape while maintaining the desired polymer flow. For example, it is possible to use a Hastelloy diffusion section formed by sintering metal particles, such that the resulting section has a pore size of about 5 $\mu$m, with about 50 vol. % porosity.

The process of the invention is capable of making plastic optical fiber from a variety of materials, in a variety of diameters, and with a variety of refractive index profiles. Typical outer diameters, including a reinforcing protective cladding, range from 250 to 1000 $\mu$m.

Numerous variations of the above-described apparatus and process steps are possible. For example, it is possible to use additional polymer reservoirs and/or different or additional extrusion crossheads, if such an arrangement contributes to attainment of a particular refractive index profile or other desired fiber characteristics. Additional or different polymer flow and/or feed sections are also possible, e.g., additional flow sections may be present between the reservoirs and the thermal homogenizer sections and/or between the thermal homogenizer sections and the flow restrictor sections.

The invention will be further clarified by the following example, which is intended to be exemplary.

EXAMPLE

The apparatus set-up is similar to that illustrated in FIG. 1.

Gas pressure to the core and cladding reservoirs was provided by nitrogen gas, the nitrogen gas source at a pressure of about 2400 psi. Before reaching the reservoirs, the gas flowed through two high pressure regulators to control the pressure delivered to the reservoirs, and then through three filters—a 1 $\mu$m filter, a 0.01 $\mu$m filter, and another 1 $\mu$m filter.

The cylindrical core reservoir, 24 inches in length with an inner diameter of 1.374 inches, was connected through a tapered adapter to a flow restrictor assembly, which in turn was connected through an adapter to a crosshead of the design shown in FIG. 2. The flow restrictor assembly consisted of the thermal homogenizer—a 3.97 inches long nickel tube having an inner diameter of 0.245 inches and the flow restrictor—a 5 inches long nickel tube having an inner diameter of 0.055 inches. The connections between the tubes and between the tubes and the adapters were made with Swageloc™ fittings. The entire flow restrictor assembly was encased in a split aluminum cylinder, milled out in the center to fit closely around the enclosed tubing and fittings to promote temperature uniformity. The cylinder was wrapped with heating tape which was controlled via an RTD inserted in a well in the aluminum cylinder, with the RTD connected to an Omega MC572333 temperature controller. Using heating tapes, the core reservoir was configured with three separately controlled heating zones comprising the lower half of the reservoir, the upper half of the reservoir and the reservoir lid. This arrangement allowed higher temperatures to be used in the head space region of the reservoir to prevent any dopant that evaporated from the free surface of the molten core polymer from condensing on the inner wall or lid of the reservoir.

The cylindrical cladding reservoir had the same dimensions as the core reservoir and was similarly connected to the crosshead via adapters and a flow restrictor assembly. The flow restrictor assembly consisted of the thermal homogenizer—a 12.25 inches long nickel tube having an inner diameter of 0.245 inches and the flow restrictor—a 10 inches long nickel tube having an inner diameter of 0.120 inches. The thermal homogenizer tube had a 90° bend to accommodate entry of the cladding line into the side port of the crosshead. For temperature control and uniformity the flow restrictor assembly was encased by two milled out split aluminum cylinders, one for each leg on either side of the 90° bend. Temperature control of the flow restrictor assembly was effected in the same manner as was done for the core flow restrictor assembly. The cladding reservoir was configured with two separately heated zones, comprising its upper and lower halves. There was no need to control the temperature of the cladding reservoir lid because the vapors in the head space of the undoped cladding polymer did not contain condensable material from the polymer.

The crosshead to which the core and cladding flow restrictors were attached was independently heated with a band heater controlled by an RTD and an Omega Model CN76000 temperature controller. A diffusion section, having an inner diameter of 0.276 inches and a length of 12.5 inches, was attached to the output of the crosshead through an adapter. The diffusion section was encased with a closely fitting, split aluminum cylinder. The cylinder was wrapped with heating tape and its temperature was independently controlled with a thermocouple and Omega Model CN76000 temperature controller. A die having a land with a diameter of 2 mm and a length of 5 mm was connected through an adapter to the diffusion section. The die and adapter were encased with a split aluminum cylinder, wrapped with heating tape and temperature controlled with a thermocouple and an Omega CN76000 temperature controller.

Poly (perfluorobutenyl vinyl ether) (commercially available as CYTOP™, from Asahi Glass Co., Japan), cast as a clean cylindrical rod, was placed in the cladding reservoir and the reservoir lid which incorporated an O-ring seal was bolted in place. A CYTOP™ rod, uniformly doped with a perfluorinated dopant which raised its refractive index by approximately 1.0%, was placed in the core reservoir and the reservoir lid was similarly bolted in place. Both reservoirs were then heated to melt the polymer rods and allow them to flow under gravity to form melt pools in the bottoms of the reservoirs. Several hours were required to eliminate air bubbles to form consolidated melt pools. The core reservoir temperatures were controlled at 190° C. (bottom zone), 210° C. (top zone) and 220° C. (lid). Consolidation to an acceptable, essentially bubble-free state was accomplished in approximately 18 hours. The cladding reservoir temperatures were controlled at 240° C. (bottom zone) and 220° C. (top zone). Consolidation to an acceptable, essentially bubble-free state was accomplished in approximately 96 hours.

Two series of runs were carried out to demonstrate how the refractive index profile and diameter of the fiber core is capable of being controllably changed by independently varying the core and cladding flow restrictor assembly temperatures, which in turn control the relative core and cladding polymer flow rates. In these runs, the total polymer throughput, and hence the fiber production rate, was kept approximately constant. The crosshead temperature was controlled at 240° C. and the diffusion section and the die and adapter were controlled at 230° C.

In the first series of runs the cladding flow restrictor assembly temperature was held constant at 240° C. and the core flow restrictor assembly temperature was varied. The core flow restrictor assembly temperature was first set at 220° C. The nitrogen gas pressure applied to the core and cladding reservoirs was increased gradually stepwise until the total polymer output from the die reached approximately 0.8 g/min. This output was achieved at a gas pressure of 412 psi. The polymer strand extruded from the die was threaded through a glass tube. This tube was placed coaxially around the fiber and against the face of the die in order to provide uniform cooling conditions in the drawdown region to minimize diameter variations of the fiber. Beyond the exit end of the tube the fiber was passed through a LaserMike Model 910 diameter monitor and then into a Heathway Model HTD-209 variable speed capstan. The capstan speed was adjusted to produce a fiber with an outer diameter of approximately 350 microns.

Figure 5A:
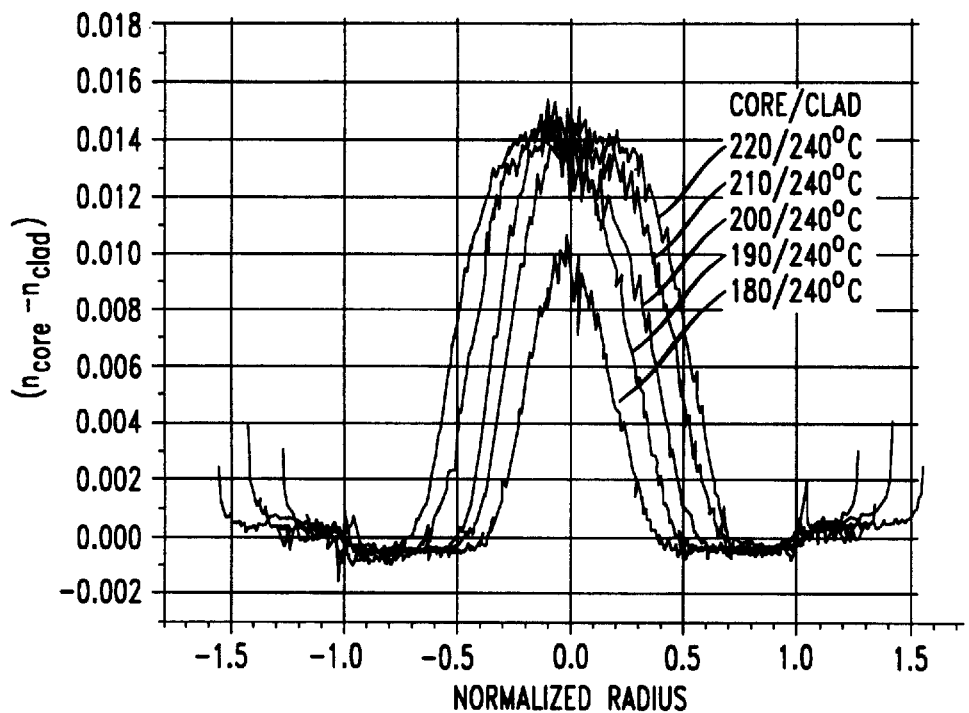
FIGS. 5A and 5B illustrate the ability of the invention to control refractive index profile by adjusting temperature of the flowing polymer.

The process was run for a period of time—about 1.5 hours—to achieve a steady state refractive index profile. A fiber sample was then collected and its refractive index profile determined using a Leitz interference microscope via the transverse interferometric method (see D. Marcuse, *Principles of Optical Fiber Measurement*, Academic Press, New York, 1981, pp. 150–161). A solution of water and propylene glycol in the weight ratio 92.2 to 7.8 was used to match the refractive index of the CYTOP™ polymer cladding (1.342). The refractive index profile was plotted as the local refractive index change relative to that of the cladding against the radial position, normalized by the fiber radius, as shown in FIG. 5A. To complete the series of runs, the core flow restrictor assembly temperature was changed in 10° C. increments from 220° C. to 180° C., while keeping all other temperatures fixed. After each incremental temperature change of the core restrictor assembly, about 1.5 hours was allowed to achieve steady state conditions and the nitrogen gas pressure was adjusted to keep the total polymer output at approximately 0.8 g/min. Fiber samples were collected for each temperature change, and the refractive index profiles were determined. The results are shown in FIG. 5A.

It is apparent from FIG. 5A, that when the core flow restrictor assembly temperature is decreased relative to that of the cladding flow restrictor assembly, the fiber core diameter is decreased relative to the constant cladding diameter. This result indicates that the effect of decreasing the core flow restrictor temperature is to decrease the volumetric flow rate of core polymer through the process relative to that of the cladding polymer. Significant changes in the shape of the refractive index profiles are also evident as the core restrictor assembly temperature is decreased relative to that of the cladding flow restrictor. At the highest core flow restrictor temperature, the refractive index profile has a relatively flat central region at the peak. As the core flow restrictor temperature is lowered, the refractive index peak becomes sharper. At the lowest core flow restrictor assembly temperature of 180° C., the refractive index profile is not only sharply peaked, but the refractive index change at the center of the core is reduced from 0.014 to 0.010. At this condition the volumetric flow rate of the core polymer relative to that of the cladding has been reduced to such a degree that dopant at the center of the core is depleted in the diffusion region of the process. This series of runs demonstrates that a high degree of control of the refractive index profile of the fiber can be achieved through control of the relative temperatures of the core and cladding flow restrictors, according to the process of the invention.

In a second series of runs, the temperature of the core flow restrictor assembly was held constant at 200° C. while the temperature of the cladding flow restrictor assembly was varied stepwise in 10° C. increments from 260° C. to 240° C. As in the previous series of runs, the nitrogen gas pressure was set at a value that produced a total polymer output of approximately 0.8 g/min. The temperatures of the crosshead, diffusion section and die and adapter were the same as those used in the first series. Steady state conditions were achieved at each cladding flow restrictor temperature prior to collecting a sample for measurement of refractive index profile.

Figure 5B:
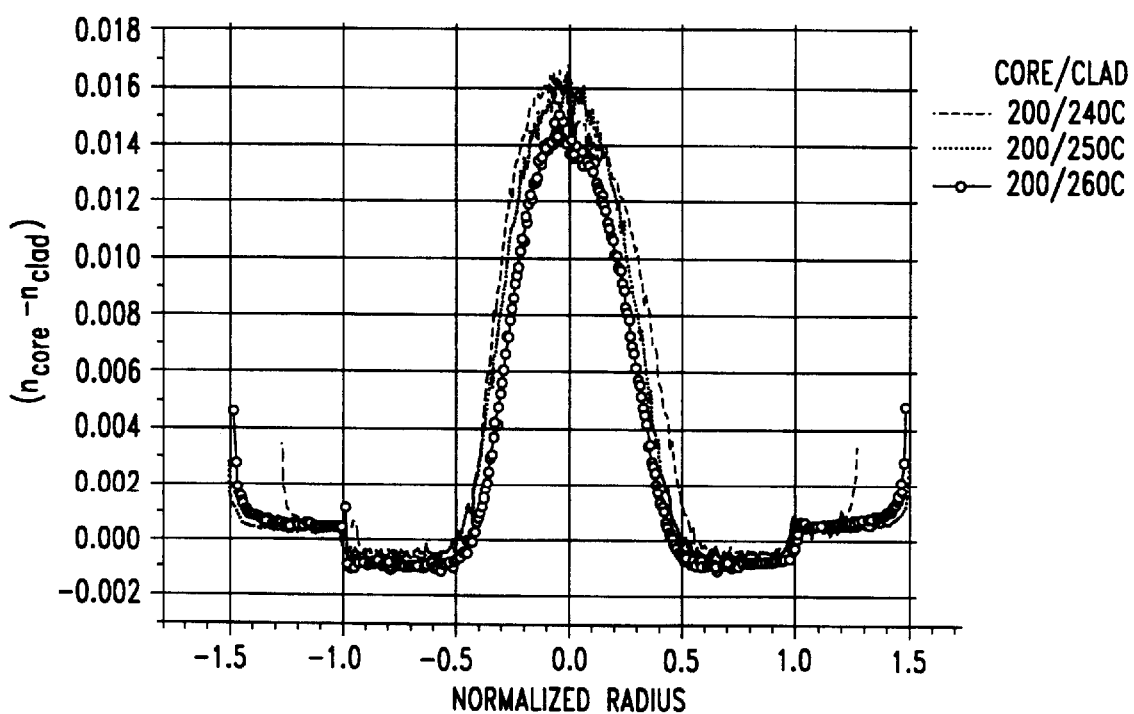

The refractive index profiles from the second series of runs are plotted in FIG. 5B. As the cladding flow restrictor temperature is decreased relative to that of the core flow restrictor, the fiber core diameter increases. At the highest cladding flow restrictor temperature of 260° C., a slight depression of the peak refractive index (relative to the cladding) from 0.14 to 0.12 is apparent. At a cladding flow restrictor temperature of 240° C., the peak refractive index of 0.14, characteristic of the fully doped core, is observed. Overall, the changes in the core diameter and refractive index profile afforded by varying the cladding flow restrictor assembly temperature relative to that of the core are smaller than vice versa. Hence a high degree of fine tuning of the fiber core diameter and refractive index profile are possible by the use of temperature to control the relative volumetric flow rates of the core and cladding polymers through flow restricting capillaries interposed between the reservoirs and crosshead of the gas pressure extrusion system.

Other embodiments of the invention will be apparent to those skilled in the art from consideration of the specification and practice of the invention disclosed herein.

What is claimed is:

1. A process for fabricating plastic optical fiber, comprising the steps of:
   (a) providing a core polymer reservoir comprising a molten core polymer, the core polymer reservoir comprising a core fluid inlet and a core polymer outlet, and providing a cladding polymer reservoir comprising a molten cladding polymer, the cladding polymer reservoir comprising a cladding fluid inlet and a cladding polymer outlet, wherein the molten core polymer, the molten cladding polymer, or both the molten core polymer and the molten cladding polymer optionally comprise one or more dopants;
   (b) directing fluid into the core fluid inlet and into the cladding fluid inlet, such that the fluid causes a pressure to be exerted on the molten core polymer and on the molten cladding polymer;
   (c) bringing at least a portion of the molten core polymer to a substantially uniform temperature in at least one of a portion of the core polymer reservoir and a core thermal homogenizer section connected directly or indirectly to the core polymer reservoir; bringing at least a portion of the molten cladding polymer to a substantially uniform temperature in at least one of a portion of the cladding polymer reservoir and a cladding thermal homogenizer section connected directly or indirectly to the cladding polymer reservoir, to provide thermally homogenized molten core polymer and thermally homogenized molten cladding polymer; directing the thermally homogenized molten core polymer into a core flow restrictor section; and directing the thermally homogenized molten cladding polymer into a cladding flow restrictor section,
   wherein the temperature of at least one of the portion of the core polymer reservoir and the core thermal homogenizer section is adjustable, and wherein the temperature of the core flow restrictor section is adjustable, such that the flow characteristics of the molten core polymer are capable of being controlled by adjusting the temperatures, and
   wherein the temperature of at least one of the portion of the cladding polymer reservoir and the cladding thermal homogenizer section is adjustable, and wherein the temperature of the cladding flow restrictor section is adjustable, such that the flow characteristics of the molten cladding polymer are capable of being controlled by adjusting the temperatures;
   (d) directing the molten core polymer and molten cladding polymer from the core and cladding flow restrictor sections into a first extrusion cross-head, the first extrusion cross-head providing a polymer flow comprising the molten core polymer surrounded by the molten cladding polymer;
   (e) if the one or more dopants are present, directing the polymer flow comprising the molten core polymer surrounded by the molten cladding polymer into a diffusion section, wherein at least a portion of the one or more dopants diffuse from the molten core polymer into the molten cladding polymer, from the molten cladding polymer into the molten core polymer, or from the molten core polymer into the molten cladding polymer and from the molten cladding polymer into the molten core polymer; and
   (f) directing the polymer flow into a die and drawing the plastic optical fiber from the die.

2. The process of claim 1, wherein at least a portion of the molten core polymer is brought to the substantially uniform temperature in the core thermal homogenizer section, and wherein at least a portion of the molten cladding polymer is brought to the substantially uniform temperature in the cladding thermal homogenizer section.

3. The process of claim 2, wherein the temperature of the core thermal homogenizer section is the same as the temperature of the core flow restrictor section, and wherein the temperature of the cladding thermal homogenizer section is the same as the temperature of the cladding flow restrictor section.

4. The process of claim 3, wherein a first heating apparatus heats both the core thermal homogenizer section and the core flow restrictor section, and wherein a second heating apparatus heats both the cladding thermal homogenizer section and the cladding flow restrictor section.

5. The process of claim 1, further comprising the step of:
   prior to step (g), directing the polymer flow into a second extrusion cross-head, wherein the second extrusion cross-head surrounds the polymer flow with a protective polymer.

6. The process of claim 5, further comprising the step of directing the polymer flow from the second extrusion cross-head into a conditioning section, wherein the conditioning section directs the polymer flow into the die.

7. The process of claim 1, wherein the fluid is a gas.

8. The process of claim 7, wherein the gas comprises nitrogen.

9. The process of claim 1, wherein the molten core polymer comprises one or more dopants.

10. The process of claim 9, wherein the one or more dopants in the molten core polymer are refractive-index-raising dopants.

11. The process of claim 1, wherein the core polymer reservoir, the cladding polymer reservoir, or both the core polymer reservoir and the cladding polymer reservoir comprise a pressure transfer element, such that the fluid exerts pressure on the element and the element transfers the pressure to the molten core polymer, the molten cladding polymer, or both the molten core polymer and the molten cladding polymer.

12. The process of claim 1, further comprising the steps of providing a second core polymer reservoir comprising a second core fluid inlet and a second core polymer outlet, and providing a second cladding polymer reservoir comprising a second cladding fluid inlet and a second cladding polymer outlet, wherein the core polymer outlet and the second core polymer outlet lead directly or indirectly to a common flow section, and wherein the cladding polymer outlet and the second cladding polymer outlet lead directly or indirectly to a common flow section.

13. The process of claim 12, further comprising the steps of:

halting the flow of core polymer from the core polymer reservoir or the second core polymer reservoir, and refilling with core polymer or molten core polymer the reservoir from which the flow of core polymer has been halted; and halting the flow of cladding polymer from the cladding polymer reservoir or the second cladding polymer reservoir, and refilling with cladding polymer or molten cladding polymer the reservoir from which the flow of cladding polymer has been halted.

14. The process of claim 1, wherein the core and cladding polymers are perfluorinated polymers.

15. The process of claim 1, wherein the resultant fiber is graded-index plastic optical fiber.

16. The process of claim 1, wherein the polymers are free of the one or more dopants, and wherein the resultant fiber is step-index plastic optical fiber.

* * * * *